June 30, 1964  F. PALM  3,139,255
DISPOSABLE TRAY AND BLANK
Filed Feb. 6, 1962  3 Sheets-Sheet 1
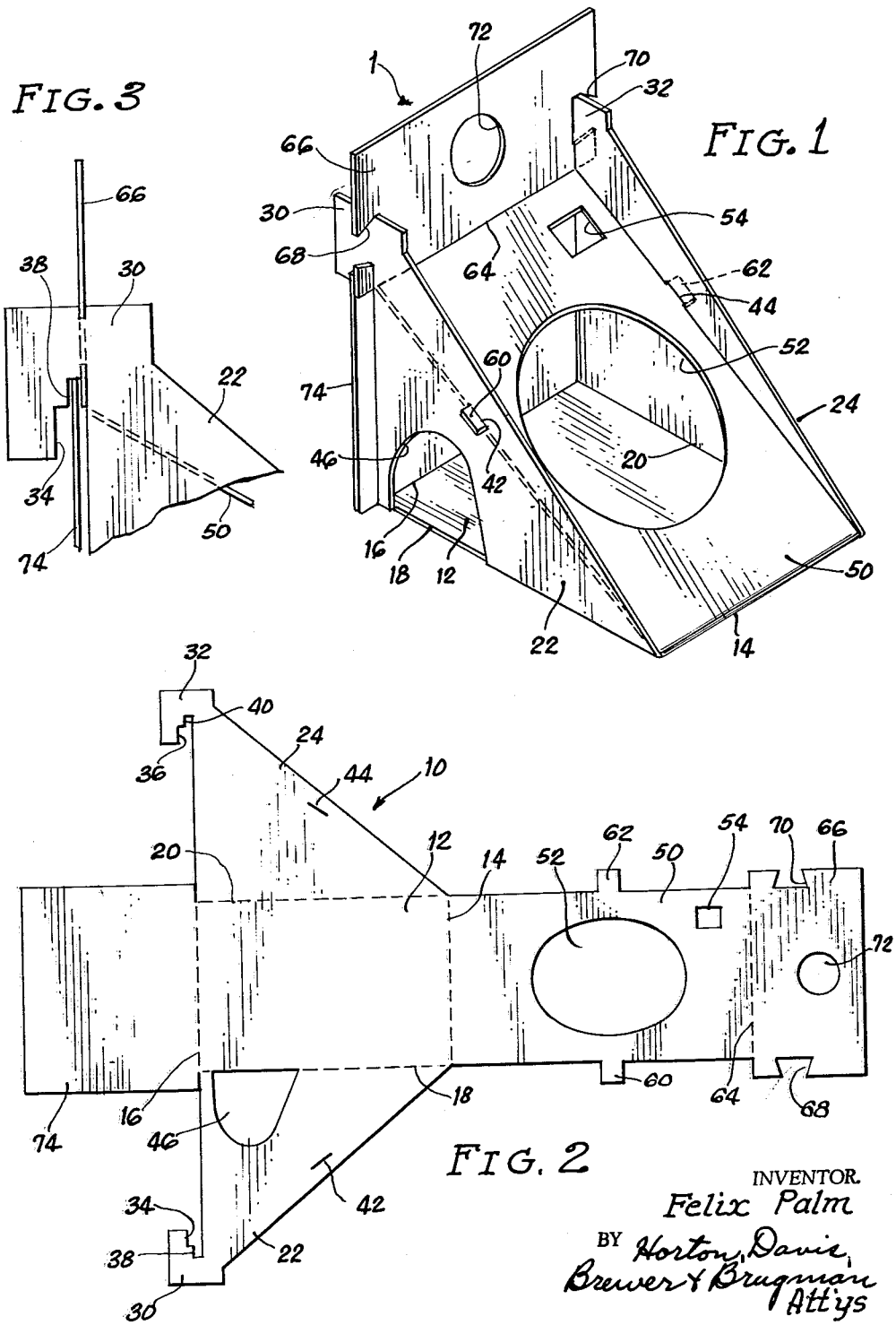
INVENTOR.
Felix Palm
BY Horton, Davis,
Brewer & Brugman
Att'ys June 30, 1964  F. PALM  3,139,255
DISPOSABLE TRAY AND BLANK
Filed Feb. 6, 1962  3 Sheets-Sheet 2

INVENTOR.
Felix Palm
BY Horton, Davis,
Bruver & Brugman
Attys

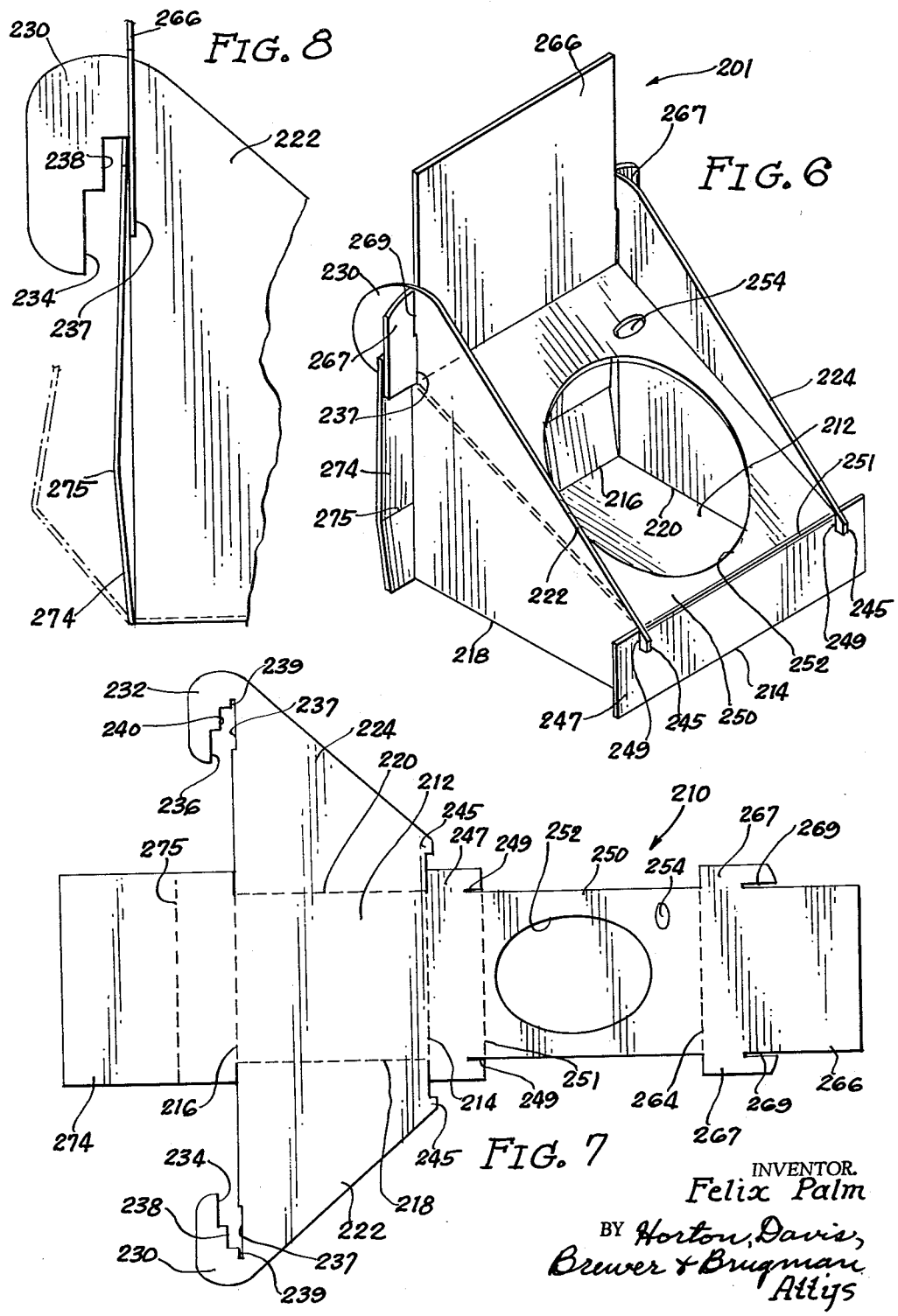

United States Patent Office 3,139,255
Patented June 30, 1964

3,139,255
DISPOSABLE TRAY AND BLANK
Felix Palm, 2241 W. Greenleaf Ave., Chicago, Ill.
Filed Feb. 6, 1962, Ser. No. 171,464
2 Claims. (Cl. 248—150)

This invention relates to disposable trays suitable for supporting food and beverages in automobiles and to the blanks from which such trays may be formed. Although the trays and the blanks from which they may be shaped are particularly adapted to be used at drive-in restaurants and drive-in movies, they are also adapted to be sold as picnic items and to be used by travelers upon the highways.

One of the principal objects of this invention is to provide novel food and beverage trays which may be simply formed from flat sheets of material and which are both very inexpensive and disposable.

It is another object of this invention to provide novel inexpensive disposable trays for food and drink which are adapted to be hung from the windows of automobiles or other vehicles having generally vertically disposed windows.

Still another object of this invention is to provide disposable trays, formable from flat sheets of inexpensive flexible materials, which are extremely strong and which are adapted to support and contain at least one container of a beverage as well as a sandwich or other food.

A further object contemplated by this invention is the provision of an inexpensive disposable food tray adapted to support and contain bevarages and food, which trays have substantial surface areas available for imprinting advertising or other desired intelligence and which embody structural elements which may be utilized to create amusing designs and to improve the overall aesthetic appearance of the trays.

Yet another object of this invention is to provide a food and beverage tray formed from a blank of relatively flexible material, portions of which render other portions thereof less flexible and more rigid when the tray is formed from the blank.

Still a further object of this invention is the provision of means which support the trays of this invention from windows of several varying thicknesses.

A further principal object of this invention is the provision of blanks of relatively flexible material such as cardboard which are formable into the food trays of this invention.

Further objects of this invention are to provide blanks of relatively flexible material which blanks are scored for cutting and folding and are shapeable into novel inexpensive trays suitable for carrying food and drink.

The trays and blanks of this invention, like the container holders described and claimed in application Serial No. 171,463, entitled "Container Holder and Blank" and filed concurrently herewith, have wide commercial potential. They are constructed of a relatively flexible material which is very inexpensive, a material such as cardboard, which material itself contributes to the strengthening and rigidifying thereof which is necessary to enable them to function as trays.

The prime users of the trays and blanks of this invention are drive-in restaurants and movies where patrons eat and drink in their automobiles. At such facilities, beverages, saidwiches, and the like are frequently balanced in precarious positions, and even when placed in relatively stable positions, patrons' arms and legs ofttimes tip over or knock down the food and drink. While trays are provided at some drive-in restaurants, not all furnish such conveniences. And to the disappointment of many restaurant owners who do provide trays, many of those trays disappear with the patrons.

The trays described and claimed herein, and the blanks from which they are formed, are peculiarly adapted to one time use, although reuse is possible. They are inexpensive enough so that they can be given to patrons with orders of food, drink, or both, and they are easily disposed of once the customer has finished. That makes them ideal for use at drive-ins. Furthermore, their loss does not occasion the capital expense necessary to replace missing non-disposable trays.

The cost to the restaurant operator or drive-in movie operator of the disposable trays of this invention is minimized by the fact that large areas are available for advertising or other similar material, thereby providing a source of income which off-sets, in part, their cost. The value of the trays to advertisers is enhanced by the fact that certain of the structural elements of the trays can be arranged to provide amusing figures or cartoons integral with the tray. Since a wide variety of novel and intriguing design possibilities inhere in the structure of the trays, the trays' appeal to advertisers and users is increased. For example the appeal of a tray for two, such as that to be described, to certain segments of the population, is readily apparent.

The trays of this invention are very easy to form from the blanks described herein. While the blanks may be delivered to the retailer merely marked for cutting and folding, it is preferable that the portions to be removed and the lines to be severed be already removed and severed respectively. As for the lines to be folded, it is preferable that they be physically scored for ease of folding. With those done it becomes a simple matter for the blanks to be formed into the trays simply and rapidly by either the retailer or by the customer himself. However, it is to be expected that the blank would be folded into the corresponding trays by the retailer, particularly when his employees deliver the food and drink to patrons' automobiles, since the trays should arrive at the automobile ready to be hung inside the car from one of its windows, and since they are easier to deliver in set-up form.

Many other objects, advantages and benefits of these strong inexpensive disposable trays will become immediately apparent from the following description and drawings of which:

FIGURE 1 is a perspective view of a tray of this invention;

FIG. 2 is a reduced plan view of the blank from which the tray of FIG. 1 may be shaped and formed;

FIG. 3 is an enlarged side view of a portion of the tray of FIG. 1 showing one of the hooks and its environment;

FIG. 6 is a perspective view of another tray of this invention;

FIG. 7 is a reduced plan view of the blank from which the tray of FIG. 6 may be shaped and formed; and FIG. 8 is an enlarged side view of a portion of the tray of FIG. 1 showing particularly one of the hooks and its environment.

Figure 4:
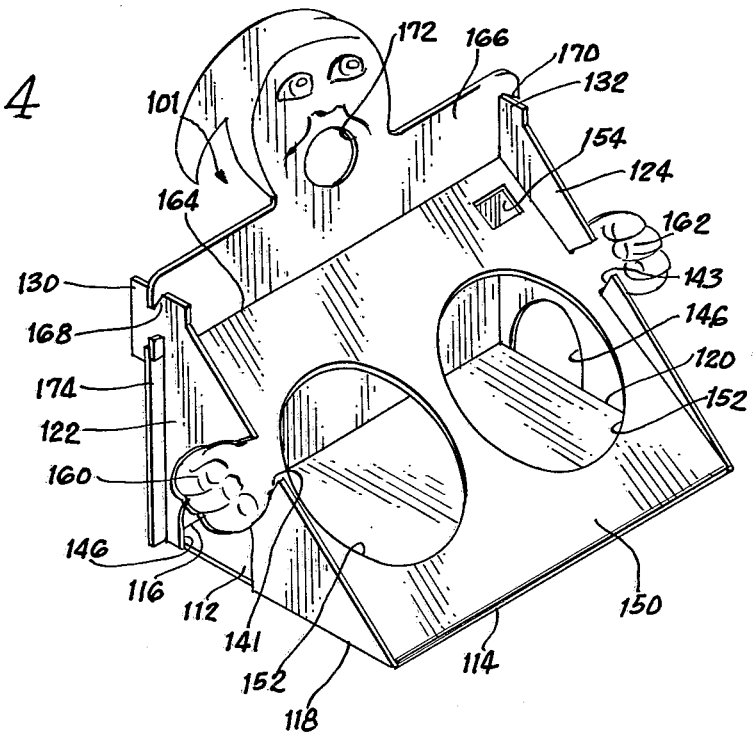
FIG. 4 is a perspective view of another tray of this invention.

An embodiment of this invention is shown in FIGS. 1 to 3. FIG. 1 shows a tray 1 formed from the blank 10 of FIG. 2.

Blank 10 is made from any relatively stiff but somewhat flexible material such as moderately heavy cardboard. Blank 10 includes a horizontally oriented base 12 having a front edge 14, a rear edge 16 and side edges 18 and 20, all of which edges coincide with lines scored for folding. When used herein the phrase "a line scored for folding" envisions a line marked for folding as well as a line which has been physically scored for folding. Similarly, the term "line scored for cutting" contemplates lines marked or inscribed for cutting, lines partially severed and lines which are completely severed. Lines scored for cutting in FIGURES 2, 5 and 7 hereof are shown as ordinary solid lines while those scored for folding are shown as dotted lines.

Sides 22 and 24 adjoin base 12 along side edges 18 and 20. Sides 22 and 24 are generally triangular in shape and are adapted to be substantially vertically disposed. As shown in FIGS. 1 to 3, sides 22 and 24 include hooks 30 and 32 so dimensioned that tray 1 of this invention may be hung from the upper edges of generally vertically disposed windows of automobiles and other vehicles.

The inner portions of the hooks 30 and 32, that is the portions which fit over the windows, consist of wide notch portions 34 and 36 respectively, and narrow notch portions 38 and 40 respectively. Notch portions 34, 36, 38 and 40 are dimensioned so that the tray of this invention may be hung from both the thinner and thicker automobile windows in vogue on various of the present day automobiles.

Sides 22 and 24 also include slots 42 and 44, respectively, which are shown in FIG. 2 as lines scored for cutting. Those slots are arranged to matingly receive tongues to be described. Surrounded by a line scored for cutting, a large aperture 46 in side 42 enables one to reach and utilize the interior of the tray of this invention. Aperture 46 is dimensioned so that a hot dog, hamburger, french fries or the like may be inserted, removed and reinserted.

A receptacle element 50 is hingedly connected to base 12 along front edge 14 thereof. As may best be seen in FIG. 1, receptacle element 50 is disposed angularly with respect to the horizontal at an angle not quite as steep as that at which the upper edges of sides 22 and 24 slope. As such, receptacle element 50 lies between sides 22 and 24, thereby serving to strengthen the entire tray structure.

Receptacle element 50 defines at least one aperture, aperture 52 shown in FIG. 2 as being circumscribed by a line scored for cutting. Aperture 52 is dimensioned so that a cup, glass or bottle may be inserted therethrough to be supported by either or both of receptacle element 50 and base 12. Optionally, an aperture 54 circumscribed by a line scored for cutting may be provided so that straws, spoons or forks may be conveniently carried by the tray.

Also integral with receptacle element 50 are two tongues 60 and 62. Tongues 60 and 62 extend outwardly of the side edges of receptacle element 50 and are positioned to be matingly received by slots 42 and 44 of sides 22 and 24 of the tray. This tongue and slot arrangement locks receptacle element 50 to sides 22 and 24 and serves to stabilize, rigidify and reinforce the entire tray assembly as well as to strengthen receptacle element 50.

At its upper edge 64, as seen in FIG. 1, receptacle element 50 terminates in a line scored for folding. Hingedly attached to the receptacle element along that line is a spacer member 66 which is somewhat wider than receptacle element 50 and, as shown in FIG. 1, extends outwardly of the two sides 22 and 24. Spacer member 66, substantially vertically disposed in use, includes a pair of notches 68 and 70. Those notches are dimensioned so that they will grip hooks 30 and 32 in the manner shown in FIG. 1, thereby maintaining the predetermined desired spacing between sides 22 and 24. Optionally, an aperture 72 circumscribed by a line scored for cutting may be provided to facilitate carrying the tray of this invention.

A rear flap 74 is hingedly connected along the rear edge 16 of base 12. As best seen in FIG. 1, flap 74 extends somewhat beyond sides 22 and 24 of tray 1. It also extends upwardly and is maintained in a generally vertical disposition by hooks 30 and 32. Flap 74 serves to reinforce and strengthen base 12 and also to close the rear of the tray of this invention so that food may be carried on the tray's interior without falling out. It provides a convenient means for inserting and removing food from the tray's interior when no aperture is provided in the tray's side.

Figure 5:
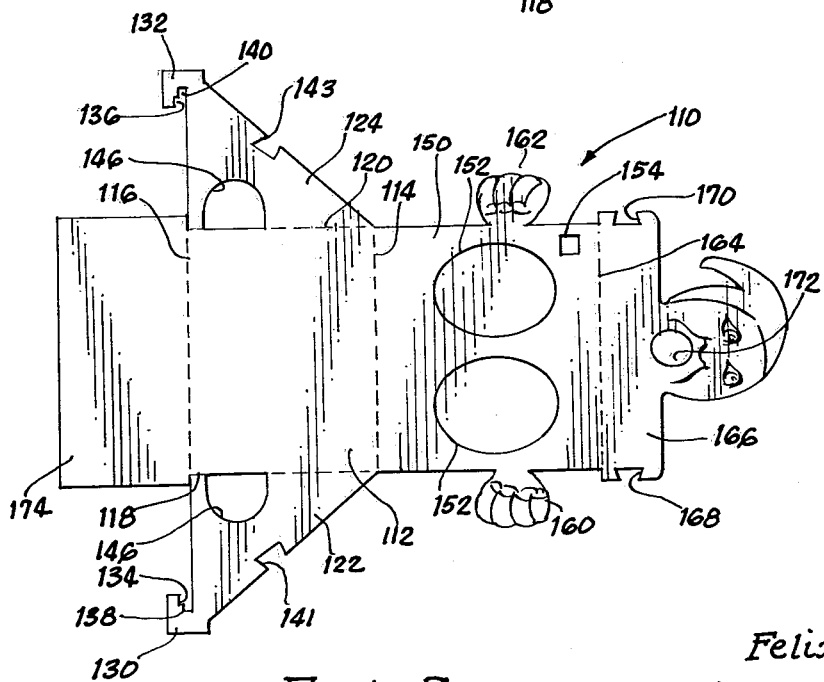
FIG. 5 is a reduced plan view of the blank from which the tray of FIG. 4 may be shaped and formed.

Another embodiment of this invention having certain different and additional features not shown in the embodiment of FIGS. 1 to 3 is illustrated in FIGS. 4 and 5. FIG. 4 shows a tray 101 of this invention and FIG. 5 illustrates the blank 110 from which tray 101 may be shaped. Tray 101 includes a base 112 having a front edge 114, a rear edge 116 and side edges 118 and 120. Hingedly attached along side edges 118 and 120 are substantially vertically disposed sides 122 and 124 which are generally triangular in shape and which terminate in hooks 130 and 132 having notches 134, 136, 138 and 140 corresponding generally to those shown in FIGS. 1 to 3. Sides 122 and 124 include notches 141 and 143, defined in FIG. 5 by lines scored for cutting, which are adapted to matingly receive tongues integral with the receptacle element in a manner to be described. Apertures 146 are also provided, one in each of side 122 and side 124, so that food may be removed from the inside of the tray in the same manner as was described in connection with the embodiment of FIGS. 1 to 3.

Hingedly connected along the front edge 114 of base 112 is an angularly disposed receptacle element 150 which defines a plurality of apertures 152. Each of the apertures 152 is adapted to receive and support beverage containers either by itself or in cooperation with base 112. One or more apertures 154 defined by lines scored for cutting are also provided for straws, spoons and the like.

Extending outwardly of the sides of angularly disposed receptacle element 150 are tongues 160 and 162 which are dimensioned to fit and interlock with notches 141 and 143, as is best seen in FIG. 4. Notches 141 and 143 and tongues 160 and 162 cooperate to prevent relative movement between receptacle element 150 and sides 122 and 124, respectively, particularly in the areas of the cooperating tongue and notch structures, and assist in rigidifying tray 101 as well as in strengthening and reinforcing the receptacle element.

In a manner similar to that described in connection with the embodiment of FIGS. 1 to 3 there is attached at the upper edge 164 of receptacle element 150 a spacer member 166 having notches 168 and 170 defined by lines scored for cutting. The spacer member 166 is adapted to engage and lock hooks in a predetermined spaced relationship. Optionally an aperture 172 in spacer member 166 may be provided to facilitate carrying.

At the rear of base 112 and along rear edge 116 thereof a flap 174 is hingedly connected. Flap 174 cooperates with the rear of tray 101 in the same maner as was described in connection with the embodiment of FIGS. 1 to 3.

The embodiment of the invention shown in FIGS. 6 to 8 is somewhat different from those of FIGS. 1 to 5.

FIG. 6 shows a tray 201 formed from the blank 210 of FIG. 7. The blank is made of any relatively stiff but somewhat flexible material such as moderately heavy cardboard. Blank 210 includes a base 212 having front edge 214, rear edge 216 and side edges 218 and 220, all of which coincide with lines scored for folding. Sides 222 and 224, hingedly adjoining side edges 218 and 220 include hooks 230 and 232 at their upper ends. For the same purposes described in connection with earlier embodiments, hooks 230 and 232 include wide notch portions 234 and 236 and narrow notch portions 238 and 240. For a purpose to be described additional notches 237 adjacent the supporting elements are provided. Notches 237 terminate in slots 239 in the upper portions of hooks 230 and 232. At their forward ends, sides 222 and 224 terminate in locking projections 245. Those projections are adapted to engage and mate with a pair of locking slots to be described.

Reinforcing member 247 is hingedly connected to base 212 along its forward edge 214. As shown in FIG. 7 reinforcing member 247 includes a pair of locking slots 249 which are adapted to matingly receive locking projections 245. The projections and slots lock to rigidify and strengthen tray 201.

A receptacle element 250 is hingedly connected at one end to reinforcing member 247 along a hinge line 251 scored for folding. Receptacle element 250 includes beverage container receiving aperture 252 and straw and utensil aperture 254, apertures similar to those previously described.

Hingedly attached to the other end of receptacle element 250 along the upper edge 264, a line scored for folding, there is a spacer member 266 optionally having a carrying aperture 272. Each side of spacer member 266 has a widened portion 267. Extending along each of the sides of the spacer member and into the widened portions 267 there are locking slots 269 shown in FIG. 7 as lines scored for cutting. Slots 269 are dimensioned and positioned to fit within notches 237 and slots 239 of side members 222 and 224 thereby causing the side members and the spacer member to interlock when the tray 201 of this invention is ready for use.

Flap 274, hingedly connected to base 212 along rear edge 216 extends outwardly of sides 222 and 224. It includes a horizontal hinge line 275 scored for folding which facilitates the slipping of flap 274 beneath hooks 230 and 232 to assume the position best shown in FIG. 8. Flap 274 enables one to reach the interior of the tray of this invention.

Many other structural variations will become apparent from an examination of the foregoing description. For example, it would be possible in accordance with the foregoing to construct a tray having apertures and space for two beverage containers in tandem rather than in the side by side relationship of FIGS. 4 and 5. Another possibility resides in widening the trays of FIGS. 1 to 3 and 6 to 8 slightly and adding an aperture in the receptacle element for a hamburger, hot dog or other food. That would eliminate the need for reaching the interior of the tray through apertures in the sides or from the rear adjacent the flaps. Especially in such a situation, the receptacle element could be hingedly connected at the rear of the base, rather than at the front as shown in the embodiments illustrated.

To form the trays from the blanks of this invention it is first necessary to remove all undesired portions not yet removed. So also must all of the lines scored for cutting be severed. Thus, in the case of blank 10 of FIG. 2, all of the material bounded by lines scored for cutting, such as the material filling apertures 46, 52, 54 and 72 should be removed, all slots such as 42 and 44, and all notches such as 68, 70, 34, 36, 38 and 40, should be freed of solid material. All of the material surrounding blank 10 should be eliminated as well. It is probable that all of this will have been done by the manufacturer and it will only be necessary for the retailer to fold the various parts along the lines scored for folding to cause them to assume their desired relationships.

With that done, the sides 22 and 24 are folded upwardly along edges 18 and 20 of base 12. Receptacle element 50 and attached spacer member 66 are folded upwardly and rearwardly along front edge 14 of base 12 and tongues 60 and 62 are inserted in slots 42 and 44 respectively. Then spacer member 66 is folded forwardly along edge 64 and notches 68 and 70 are caused to engage and interlock with hooks 30 and 32. Finally flap 74 is folded forwardly and upwardly along rear edge 16 and the upper edge thereof is made to lie between the forward edges of hooks 30 and 32 and the rearwardly disposed edges of sides 22 and 24 as is best seen in FIG. 3.

Thus formed, tray 1 is ready to be filled with food, drink and utensils and to be delivered to the patron or to his automobile where it is hung inside the automobile from one of the windows, shown in FIG. 1 in phantom as W.

Tray 1, as well as the other trays constructed in accordance with this invention, is extremely strong, the various portions tending to strengthen and reinforce other of the portions. That is important since the materials intended to be used in the practice of this invention, such as cardboard, are somewhat flexible and to make the trays rigid enough to support the weights which will be used it is necessary to provide some reinforcement. The various locking means which have been described in connection with tray 1, as well as with trays 101 and 201, all assist in maintaining the parts of the tray in predetermined relationships and in reinforcing the overall structure. The locking means also make the trays sturdier, hence easier to carry and to install in automobiles.

Tray 101 is formed from blank 110 by following the same steps as were described in connection with the embodiment of FIGS. 1 to 3. However, instead of utilizing the tongue and slot locking arrangement of FIGS. 1 to 3, tongues 160 and 162 and notches 141 and 143 are the medium provided whereby sides 122 and 124 may be fixed with respect to receptacle element 150.

Tray 201 is formed from blank 210 which has had all lines scored for cutting severed and all waste removed in a manner similar to blank 10. Sides 222 and 224 are folded upwardly and inwardly along side edges 218 and 220. Reinforcing member 247 is folded upwardly and slots 249 are caused to engage locking projections 245. Then receptacle element 250 is folded rearwardly along hinge line 251 until it is disposed at the desired angle to the horizontal. At that time spacer member 266 is folded along upper edge 264 of receptacle element 250, and locking slots 269 are caused to fit within and interlock with notches and slots 237 and 239. Then flap 274 is folded upwardly along rear edge 216 of base 212, is folded slightly along hinge line 275 and is disposed adjacent hooks 230 and 232 as is best seen in FIG. 8.

FIGURE 4 and particularly FIGURE 5 illustrate the gay and amusing trays which can be constructed in accordance with the teachings of this invention. Certain of the structural elements of the trays contribute substantially to the overall design appearance as well. The wide range of modifications in design which the structure of this invention permits makes it extremely valuable from a commercial standpoint.

Also contributing to the commercial saleability of the products of this invention are the large areas available on the trays for advertising matter.

Its minimal expense and its great strength also contribute to the value and benefits conferred by the blanks and trays of this invention. The materials contemplated for use in the practice of this invention are inexpensive flexible materials such as cardboard which must be reinforced or stabilized to prevent undesired flexing or bending. When constructed in accordance with the teachings of this invention an extremely strong tray results.

It is apparent that the inexpensive disposable blanks and trays described herein have multitudes of advantages and uses. It is also apparent that widely varying constructions are within the scope and spirit of this invention. Therefore, I intend the scope of this invention to be limited only as may be necessary in view of the claims appended hereto.

I claim:

1. A blank from which a tray suspendible from an automobile window may be formed comprising a flat flexible sheet of material including a central generally rectangular base portion having two side edges and two end edges, side portions connected to said base portion each along a line scored for folding along each side edge, and each extending outwardly in opposite directions from said base portion, an elongated receptacle structure portion including a receptacle element segment having a portion thereof circumscribed by a continuous line scored for cutting, said elongated receptacle structure being connected to said base along one of said end edges along a line scored for folding, said elongated receptacle structure extending outwardly from said rectangular base portion generally at right angles to the directions in which said side portions extend outwardly of said base portion, hook portions integral with said side portions and circumscribed by lines scored for cutting, and locking means including lines scored for cutting in each of said side portions and tongues extending outwardly of said receptacle structure and partially circumscribed by lines scored for cutting.

2. A blank from which a tray suspendible from an automobile window may be formed comprising a flat flexible sheet of material including a central generally rectangular base portion having two side edges and two end edges, side portions connected to said base portion each along a line scored for folding along each side edge, and each extending outwardly in opposite directions from said base portion, an elongated receptacle structure portion including a receptacle element segment having a portion thereof circumscribed by a continuous line scored for cutting, said elongated receptacle structure being connected to said base along one of said end edges along a line scored for folding, said elongated receptacle structure extending outwardly from said rectangular base portion generally at right angles to the directions in which said side portions extend outwardly of said base portion, hook portions integral with said side portions and circumscribed by lines scored for cutting, and locking means including lines scored for cutting in said receptacle structure and tongues extending outwardly of said side portions partially circumscribed by lines scored for cutting.

References Cited in the file of this patent
UNITED STATES PATENTS

| | | |
|---|---|---|
| 1,242,535 | Einson | Oct. 9, 1917 |
| 1,713,758 | Horwath | May 21, 1929 |
| 1,902,566 | Marsh | Mar. 21, 1933 |
| 2,770,513 | Brown | Nov. 13, 1956 |
| 3,031,162 | Whorton | Apr. 24, 1962 |